United States Patent [19]
Yamaguchi et al.

[11] Patent Number: 5,858,599
[45] Date of Patent: Jan. 12, 1999

[54] ANTI-OFFSETTING OIL

[75] Inventors: Hiromasa Yamaguchi; Hirofumi Kishita, both of Annaka, Japan

[73] Assignee: Shin-Etsu Chemical Co., Ltd., Tokyo, Japan

[21] Appl. No.: 965,436

[22] Filed: Nov. 6, 1997

[30] Foreign Application Priority Data

Nov. 8, 1996 [JP] Japan .................................. 8-312863

[51] Int. Cl.$^6$ ............................................. G03G 13/20
[52] U.S. Cl. .............................. 430/124; 528/18; 528/42; 528/14; 528/37; 556/488
[58] Field of Search ................................ 528/42, 18, 14, 528/37; 556/488; 430/124

[56] References Cited

U.S. PATENT DOCUMENTS 5,463,009 10/1995 Okada et al. ......................... 556/488

*Primary Examiner*—Melvyn I. Marquis
*Attorney, Agent, or Firm*—Oblon, Spivak, McClelland, Maier & Neustadt, P.C.

[57] ABSTRACT

An anti-offsetting oil including an organopolysiloxane having the formula (1) below and containing low molecular weight organopolysiloxanes having a molecular weight of 3,000 or less in a content of 50 ppm or less.

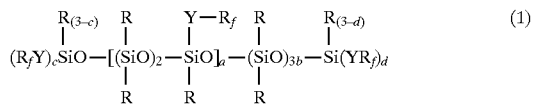

wherein $R_f$'s represent a perfluoroalkyl which may contain at least one ether linkage; R's represent a monovalent hydrocarbon group; Y's represent a divalent organic group having 2 to 5 carbon atoms; a represents an integer of 1 or more and b represents an integer of 0 or more, provided that a and b satisfy $3a+3b+2=15$ to 4,000; and c and d are an integer of 0 to 3. This fluid has a good wettability to silicone rubber or fluorine forming the surfaces of fixing rolls of electrophotographic copying machines, and hence can effectively prevent offset. Since it contains no low-molecular weight organopolysiloxanes, the electric-contact failure may hardly occur.

17 Claims, 3 Drawing Sheets

ANTI-OFFSETTING OIL

BACKGROUND OF THE INVENTION

1. Field of the Invention

This invention relates to a silicone fluid-based anti-offsetting oil used in fixing rolls.

2. Description of the Prior Art

In electrophotographic copying, as a method for heat fixing toner images formed of thermoplastic powder which have been transferred to copying sheet, it is common to bring a heated roll into direct contact with toner images. However, once the toner images turn viscous upon heat melt, a part of toner images on copying sheet such as copying paper may adhere also to the surface of the roll, so that this part of toner images is transferred from a first sheet to a next sheet when the next sheet is delivered onto the roll, and simultaneously a part of viscous toner images transferred from the next sheet adheres to the roll. This phenomenon is commonly called "offset" in printing techniques.

To solve this problem, a fixing roll has been conventionally used which comprises a core roll covered on its surface with a film having a low surface energy as exemplified by polytetrafluoroethylene (PTFE) film or tetrafluoroethylene/perfluoroalkyl vinyl ether copolymer (PFA) film on which silicone fluid is applied in a thin film at the time of heat fixing (Japanese Post-examination Patent Publication (Kokoku) No. 41-16990). In such a fixing roll, however, the roll surface has so low a surface energy that the silicone fluid applied may be repelled and no uniform coating can be formed, resulting in no sufficient anti-offset effect. As a method for improving such a fixing roll, it is proposed to use a silicone fluid to which a fluorine-containing surfactant is added (Japanese Pre-examination Patent Publication (kokai) No. 58-11624). However, because of a poor compatibility of silicone fluid with the fluorine-containing surfactant, no stable anti-offset effect has been achieved.

As an anti-offsetting silicone fluid, a silicone fluid having a fluorine-containing organic group in the molecule is also proposed (Japanese Pre-examination Patent Publication No. 51-18544). However, no sufficient effect can be achieved unless an organopolysiloxane having a long-chain fluorine-containing organic group such as a fluoroalkyl group or a fluoropolyether group is used. However, for reasons of production, such an organopolysiloxane having a long-chain fluorine-containing organic group can not avoid containing low-molecular weight volatile components, which are causative of electric-contact failure of electronic devices. For example, a linear organopolysiloxane production process comprising the step of subjecting a cyclotrisiloxane having a long-chain fluorine-containing organic group to polymerization in the presence of a catalyst such as concentrated sulfuric acid or activated clay is accompanied by depolymerization reaction, and this reaction produces as by-products volatile components such as cyclic siloxanes, in particular, cyclic oligosiloxanes with three to tens of siloxane units or a low-molecular weight linear siloxane. As known in the art, when the linear organopolysiloxane containing such volatile components is used as an anti-offsetting oil, the volatile components in this organopolysiloxane gradually volatilize to adhere to electric contacts and so forth to cause troubles such as contact failure. Accordingly, when the linear organopolysiloxane is used as an anti-offsetting oil, the content of the volatile components in it must be made as small as possible. Of the above volatile components, the low-molecular weight linear siloxanes and the cyclic siloxanes having a low degree of polymerization, i.e., having a low molecular weight can be removed by subjecting the resultant polymer to stripping under reduced pressure and heating or solvent extraction. It, however, is very difficult to remove cyclic siloxanes with a polymerization degree of 10 or more, in particular, with 20 or more. When the linear organopolysiloxane which has been thus treated is used as the anti-offsetting oil, the troubles such as contact failure can not be avoided because it contains as volatile components cyclic products with a polymerization degree of 10 or more and a molecular weight of not more than 3,000 in a rather large quantity.

For the above reasons, it has been sought to develop a silicone fluid-based anti-offsetting oil having a good wettability to low-surface energy materials such as silicone rubber and fluorine rubber and also containing no organopolysiloxane having a molecular weight of 3,000 or less including cyclic siloxanes with a polymerization degree of 20 or more.

SUMMARY OF THE INVENTION

An object of the present invention is to provide a silicone fluid-based anti-offsetting oil that can be uniformly applied on the surface of a fixing roll covered with a low-surface energy material such as silicone rubber or fluorine rubber, contains substantially no low-molecular weight siloxanes, and hence does not cause troubles such as offset and contact failure.

The present inventors made extensive studies in order to solve the above problems that the conventional silicone fluid-based anti-offsetting oils have had. As the result, they took note of the fact that a linear organopolysiloxane obtained by ring-opening polymerization of fluorine-containing cyclotrisiloxane contains volatile components such as cyclic siloxane in a small amount, and they removed volatile components from this organopolysiloxane by a known method, so that a linear organopolysiloxane was found to be obtained which contained no organopolysiloxane with a molecular weight of 30,000 or less without regard to straight-chain or cyclic, in particular, contained substantially no cyclic siloxane with 20 or more siloxane units and a molecular weight of not more than 3,000, having been hitherto difficult to remove, and also which had a good wettability to low-surface energy materials such as silicone rubber and fluorine rubber. The present invention has been accomplished from such findings.

The present invention provides an anti-offsetting oil comprising a silicone fluid comprising an organopolysiloxane represented by the following general formula (1) and in which an organopolysiloxane having a molecular weight of 3,000 or less is in a content of 50 ppm or less.

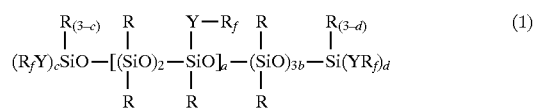

wherein $R_f$'s each represent a perfluoroalkyl group having 3 to 20 carbon atoms, which may contain at least one ether linkage therein; R's are the same or different and each represent a monovalent hydrocarbon group having 1 to 15 carbon atoms; Y's each represent a divalent organic group having 2 to 5 carbon atoms; a represents an integer of 1 or more and b represents an integer of 0 or more, provided that a and b satisfy 3a+3b+2=15 to 4,000; and c and d are each an integer of 0 to 3.

The anti-offsetting silicone fluid of the present invention contains substantially no volatile components such as low molecular weight cyclic siloxane and low-molecular weight linear siloxane, and hence does not cause the troubles such as contact failure. The present oil also shows a good wettability to low-surface energy materials such as silicone rubber and fluorine rubber, and hence can be uniformly applied on fixing rolls and can be greatly effective for improving the releasability of toners. Thus, a fixing assembly free of troubles such as electric-contact failure and offset can be produced by incorporating the anti-offsetting oil of the present invention into the fixing assembly.

DETAILED DESCRIPTION OF PREFERRED EMBODIMENTS

Figure 1:
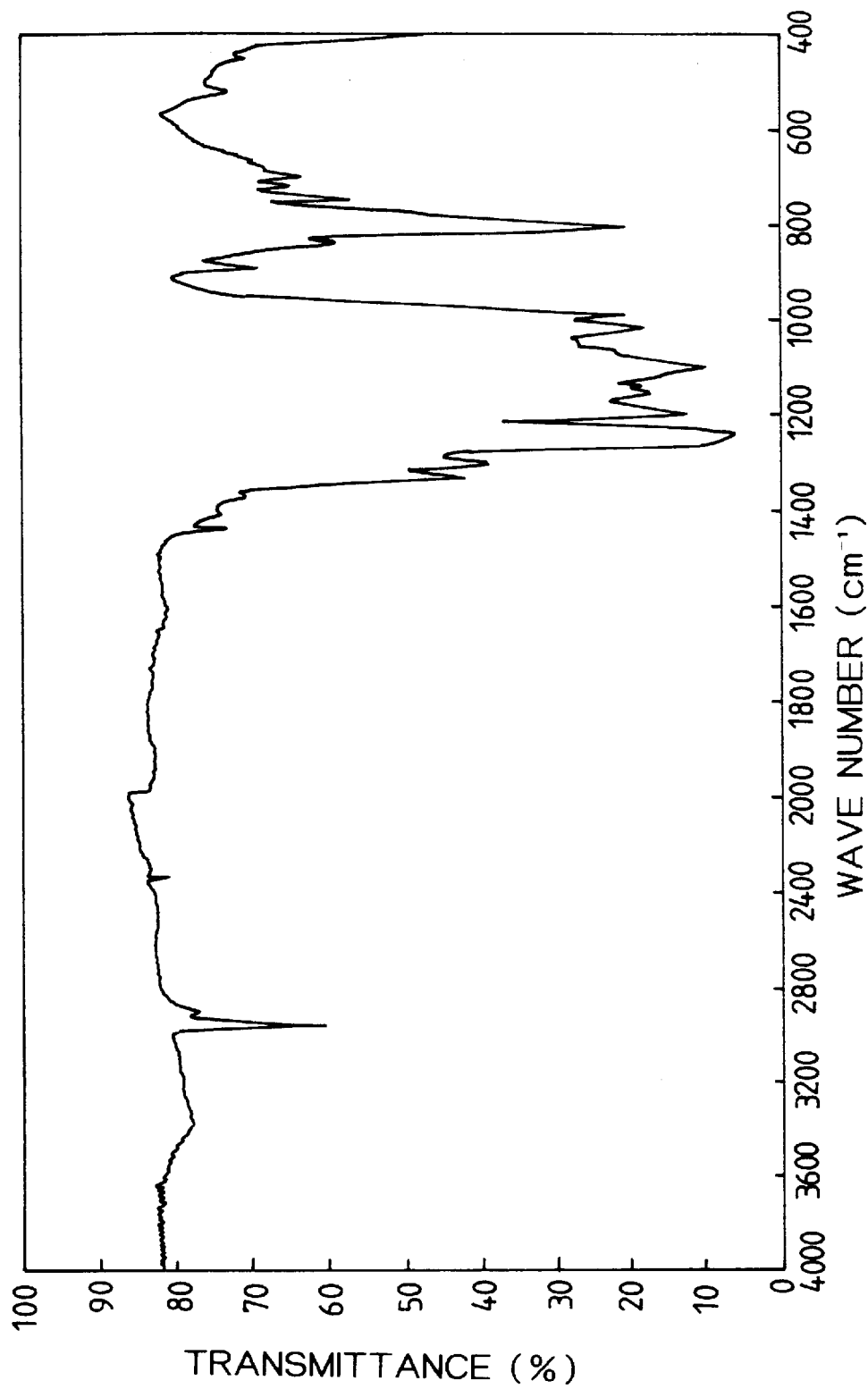
FIG. 1 shows an infrared absorption spectrum of the silicone fluid used in the present invention, produced in Synthesis Example 1.

The anti-offsetting oil of the present invention comprises the organopolysiloxane represented by the above general formula (1), provided that linear and cyclic organopolysiloxanes having a molecular weight of 3,000 or less are in a content of 50 ppm or less, preferably 25 ppm or less, and more preferably 10 or less.

In the above general formula (1), the $R_f$ perfluoroalkyl group is exemplified by:

a perfluoropolyether group represented by the following general formula (1a):

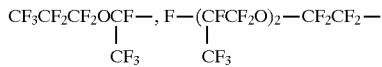

(1a)

wherein $R^1$ is —CF(CF$_3$)—, —CF$_2$CF$_2$— or —CF(CF$_3$)CF$_2$—; and p is an integer of 1 to 5; and a perfluoroalkyl group represented by the following general formula (1b):

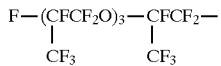

(1b)

wherein L is an integer of 3 to 20. Stated specifically, the group of formula (1a) is exemplified by

and

and the group of formula (1b) is exemplified by

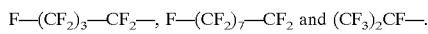

In the above general formula (1), the R monovalent hydrocarbon can be exemplified by an alkyl group, in particular, an alkyl group having 1 to 6 carbon atoms such as a methyl group, an ethyl group, a propyl group, a pentyl group or a hexyl group; an aryl group, in particular, an aryl group having 6 to 10 carbon atoms such as a phenyl group and a tolyl group; an aralkyl group, in particular, an aralkyl group having 7 to 15 carbon atoms such as a benzyl group or a phenylethyl group. Y represents a divalent organic group having 2 to 5 carbon atoms. Taking account of the fact that the anti-offsetting oil of the present invention is used in an environment of high temperature, the Y divalent organic group may preferably be an alkylene group or an amide linkage (—NHCO—), and particularly preferably an ethylene group.

In the above general formula (1), the letter symbol a represents an integer of 1 or more and b represents an integer of 0 or more, provided that a and b satisfy 3a+3b+2=15 to 4,000; and c and d are each an integer of 0 to 3. Of these, the degree of polymerization indicated by "3a+3b+2" may preferably be such a value that this silicone fluid may have a viscosity at 25° C. of from 100 to 30,000 cSt, and preferably from 300 to 3,000 cSt.

In order to control the content of the volatile components such as low molecular weight cyclic siloxane to a lower level from the initial stage of production, the silicone fluid used in the present invention may preferably be produced in the following manner.

Fluorine-containing cyclotrisiloxane represented by the following general formula (2):

(2)

wherein $R_f$ and R's are as defined in the above general formula (1);
and optionally cyclotrisiloxane represented by the following general formula (3):

(3)

wherein R's are as defined in the above general formula (1); are ring-opening polymerized in the presence of a lithium silanolate catalyst, and the polymerization product obtained is treated by heating at 100° C. or above, under a reduced pressure of $10^{-1}$ mmHg or below, and/or by solvent extraction to remove volatile components from the polymerization product. Thus, a silicone fluid can be obtained which is comprised of the organopolysiloxane represented by the general formula (1) and in which the organopolysiloxanes having a molecular weight of 3,000 or less (inclusive of the cyclic siloxane with 20 or more siloxane units) is in a content of 50 ppm or less.

In electrophotographic copying processes in which toner images transferred onto copying sheet such as copying paper are brought into contact with a heated roll and heat fixed, the silicone fluid thus obtained is applied on the surface of the roller in the form of a thin film, where the offset can be prevented. The roller usually has a surface formed of silicone rubber or fluorine rubber.

EXAMPLES

Working examples of the present invention will now be given below, together with comparative examples. In the following Synthesis Examples, the viscosity is a value obtained when measured at 25° C.

Synthesis Example 1

(Silicone fluid for the present invention)

Into a 1 liter separable reaction flask with a stirrer, 1,000 g (1.458 mols) of a cyclotrisiloxane represented by the formula;

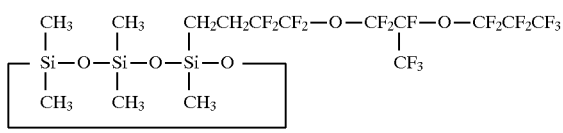

2.27 g (0.00972 mol) of pentamethylvinylcyclotrisiloxane, 2.79 g (0.00972 mol) of lithium silanolate represented by the formula:

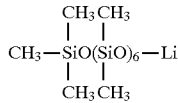

and 1.0 g of tetraglyme were charged, and reaction was carried out at a temperature of 100° C. for 5 hours in an atmosphere of nitrogen.

Next, the reaction mixture was cooled to a temperature of 50° C., and 1.58 g (0.01458 mol) of trimethylchlorosilane and 3.55 g (0.022 mol) of hexamethyldisilazane were introduced into it, followed by stirring for 2 hours to effect neutralization. Thereafter, vacuum stripping was carried out at a temperature of 150° C., and then the salt formed was filtered to obtain 952 g of an organopolysiloxane (viscosity: 14,150 cSt).

Next, this product was passed through a thin-film type molecular distillation still under conditions of 270° C. and $1 \times 10^{-4}$ mmHg to obtain 926 g of an organopolysiloxane (viscosity: 15,010 cSt).

Next, to determine cyclic polysiloxanes having a molecular weight not more than 3,000 contained in the organopolysiloxane thus produced, 1.0 g of the organopolyxane and as the internal standard 10.0 g of acetone containing 20 ppm of n-decane were put in a lidded glass bottle, followed by shaking, and thereafter the resultant mixture was allowed to stand for 24 hours. The polysiloxanes thus extracted to the acetone phase were determined by gas chromatography using a flame ionization detector (FID). The cyclic siloxanes detected were in a content of 1 ppm or less. The amount of linear siloxanes was below the detectable limit. The upper limit of the molecular weight of cyclic siloxanes detectable by means of FID is about 3,000. Therefore, the content of the siloxanes with a molecular weight of 3,000 or less can be considered as 1 ppm or less. The measurement above was performed under conditions shown below.

Instrument Used
    GC-14A, manufactured by Shimadzu corporation
Column
    Capillary column TC-1701 0.53 mm×30 mm, manufactured by GL
Temperature Program
    Initial temperature: 70° C. (1 min.);
    rate of temperature rise: 15 K/min.; final
    temperature: 270° C. (retention time: 40 min.)
Infrared absorption spectrum and $^1$H-NMR spectrum of the organopolysiloxane finally obtained as above were also measured to obtain the following results.
Infrared absorption spectrum: as shown in FIG. 1
Characteristic absorption
    990 to 1,130 cm$^{-1}$ (Si—O—Si)
    2,970, 1,260, 810 cm$^{-1}$ (Si—CH$_3$)
    1,000 to 1,450 cm$^{-1}$ (C—F)
$^1$H-NMR (freon 113 solvent)

0.76 to 1.60 ppm (m —C$\underline{H}_2$—Si—2H)
1.83 to 2.81 ppm (m —C$\underline{H}_2$—CF—2H)
0.21 to 0.52 ppm (m —C$\underline{H}_3$—Si—15H)

From the above results, the organopolysiloxane obtained was confirmed to be a linear organopolysiloxane represented by the following average molecular formula:

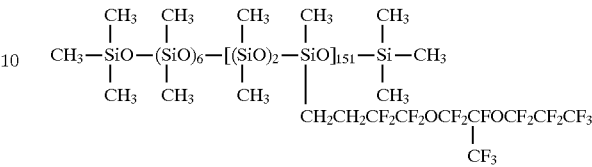

Synthesis Example 2

(Silicone fluid for the present invention)

Into a 2 liter separable reaction flask with a stirrer, 916.4 g (1.40 mols) of cyclotrisiloxane represented by the formula:

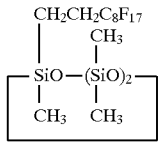

1,468.5 g (6.60 mols) of hexamethyltrisiloxane, 1,104.0 g of tetrahydrofuran (THF) and 191.1 g (0.20 mol) of a 30% by weight THF solution of lithium silanolate represented by the formula:

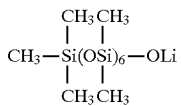

were charged, and reaction was carried out at 25° C. for 5 hours in an atmosphere of nitrogen.

Next, at this temperature, 32.6 g (0.30 mol) of trimethylchlorosilane and 72.6 g (0.45 mol) of hexamethyldisilazane were introduced into it, followed by stirring for 2 hours to effect neutralization.

Thereafter, vacuum stripping was carried out at 150° C., and then the salt formed was filtered off to obtain 2,316.0 g of an organopolysiloxane (viscosity: 374 cSt).

Next, this product was passed through a thin-film type molecular distillation still under conditions of 270° C. and $1 \times 10^{-4}$ mmHg to obtain 2,231.7 g of an organopolysiloxane (viscosity: 399 cSt).

Cyclic polysiloxanes with a molecular weight not more than 3,000 in this organopolysiloxane were determined in the same manner as in Synthesis Example 1 to reveal that the cyclic siloxanes were in a content of 25 ppm.

Infrared absorption spectrum and $^1$H-NMR spectrum of the organopolysiloxane finally obtained as above were also measured to obtain the following results.

Figure 2:
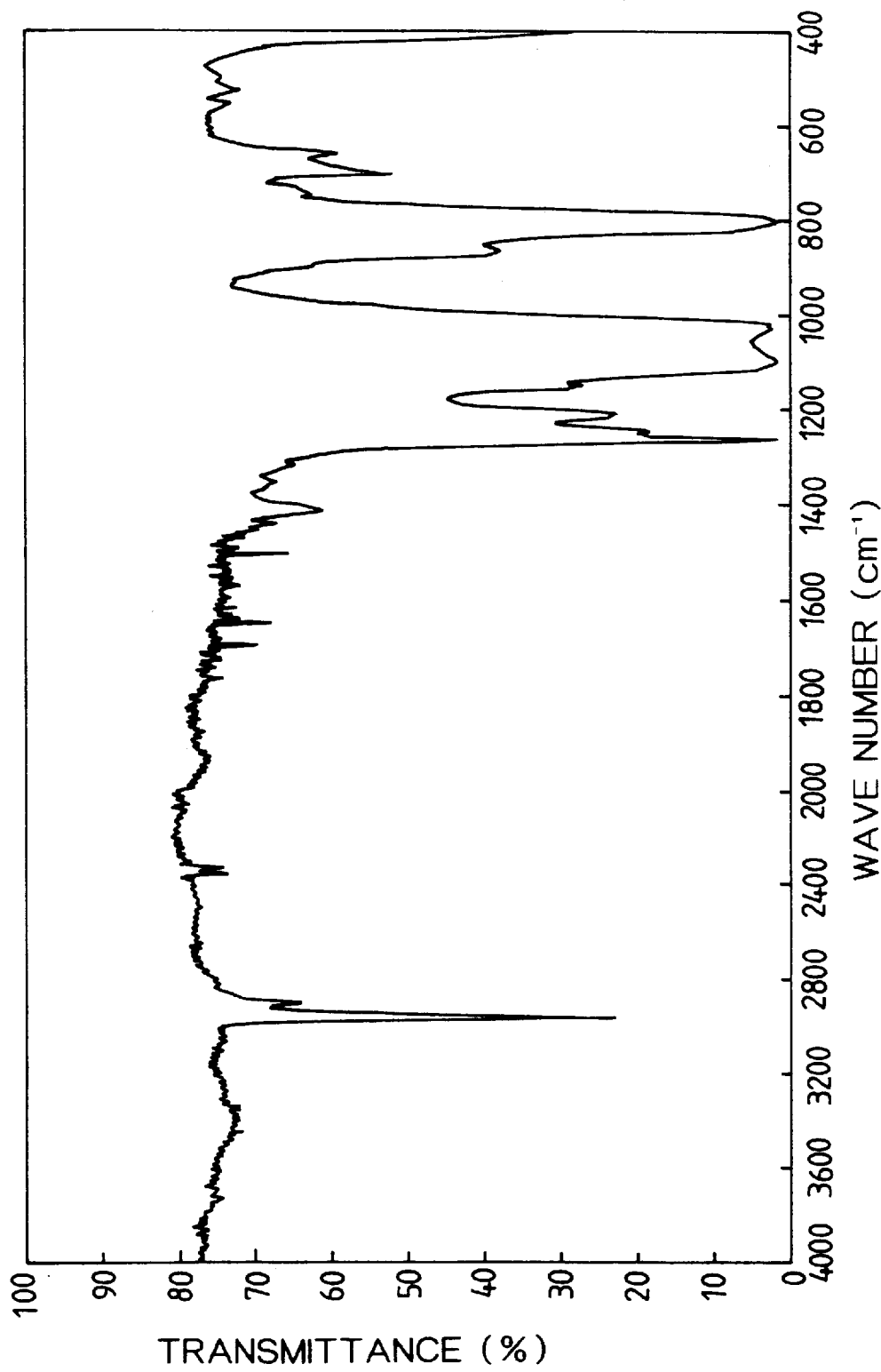
FIG. 2 shows an infrared absorption spectrum of the silicone fluid used in the present invention, produced in Synthesis Example 2.

Infrared absorption spectrum: as shown in FIG. 2
Characteristic absorption (cm$^{-1}$)
    980 to 1,100 (Si—O—Si)
    2,965, 1,265, 810 (Si—CH$_3$)
    1,000 to 1,430 (C—F)
$^1$H-NMR (freon 113 solvent)
    0.70 to 1.50 ppm (m, —C$\underline{H}_2$Si—2H)

1.75 to 2.67. ppm (m, —C$\underline{H}_2$CF—2H)

0.20 to 0.47 ppm (m, —C$\underline{H}_3$Si—99H)

From the above results, the organopolysiloxane obtained was confirmed to be a linear organopolysiloxane represented by the following average molecular formula:

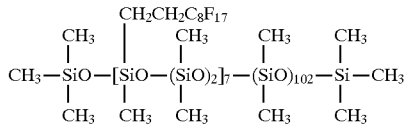

Synthesis Example 3

(Silicone fluid for comparison)

Into a 2 liter separable reaction flask with a stirrer, 837.9 g (1.28 mols) of a cyclotrisiloxane represented by the formula:

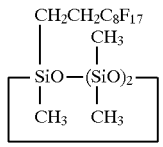

712.0 g (3.20 mols) of hexamethyltrisiloxane and 49.7 g (0.16 mol) of decamethyltetrasiloxane were charged, and 0.16 g of trifluoromethanesulfonic acid was further added in an atmosphere of nitrogen, to carry out reaction at 50° C. for 12 hours.

Next, at this temperature, 77.5 g (0.48 mol) of hexamethyldisilazane was added, followed by stirring for 2 hours to effect neutralization.

Thereafter, vacuum stripping was carried out at 150° C., and then the salt formed was filtered off to obtain 1,534.6 g of an organopolysiloxane (viscosity: 179 cSt).

Next, this product was passed through a thin-film type molecular distillation still under conditions of 270° C. and $1 \times 10^{-4}$ mmHg to obtain 1,285.0 g of an organopolysiloxane (viscosity: 238 cSt).

Cyclic polysiloxanes with a molecular weight not more than 3,000 in this organopolysiloxane was determined in the same manner as in Synthesis Example 1 to reveal that the cyclic siloxanes were in a content of 3,980 ppm.

Infrared absorption spectrum and $^1$H-NMR spectrum of the organopolysiloxane finally obtained were also measured to obtain the following results.

Figure 3:
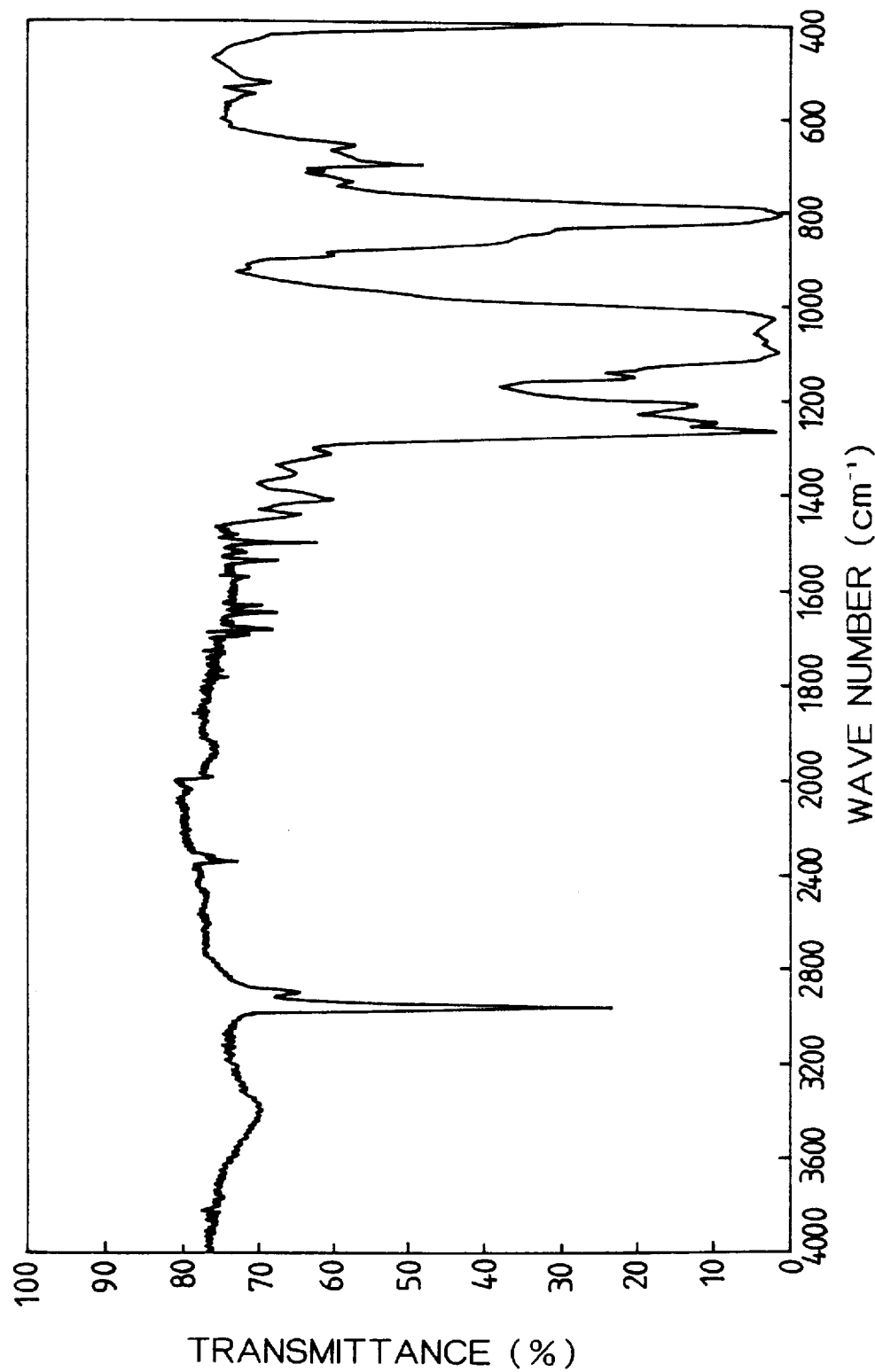
FIG. 3 shows an infrared absorption spectrum of the silicone fluid used in the present invention, produced in Synthesis Example 3.

Infrared absorption spectrum: as shown in FIG. 3

Characteristic absorption (cm$^{-1}$)

980 to 1,100 (Si—O—Si)

2,960, 1,265, 805 (Si—CH$_3$)

1,010 to 1,420 (C—F)

$^1$H-NMR (ppm; freon 113 solvent)

0.68 to 1.50 (m, —C$\underline{H}_2$Si—2H)

1.76 to 2.69 (m, —C$\underline{H}_2$CF—2H)

0.19 to 0.45 (m, C$\underline{H}_3$Si—93H)

From the above results, the organopolysiloxane obtained was confirmed to be a linear organopolysiloxane represented by the following average molecular formula:

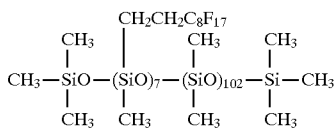

Example 1

With regard to the organopolysiloxanes produced in Synthesis Examples 1 and 2, contact angles of their samples at 25° C. on a PFA film were measured by the droplet method using a contact angle meter (CA-DT Type A, manufactured by Kyowa Kaimen Kagaku K. K.). The wettability with respect to the value of contact angle was evaluated as;

A: Good wettability (contact angle: less than 10°).

C: Poor wettability (contact angle: 10° or more).

The results of evaluation were as shown in Table 1.

Example 2

With regard to the organopolysiloxanes produced in Synthesis Examples 1 and 2, releasability of toner was evaluated in the manner shown below.

(1) On the surface of a 50 μm PFA film stuck to a silicone rubber piece (1 cm×5 cm, 2 mm thick), about 50 mg of a sample is dropped, and coated using absorbent cotton in the form of thin film.

(2) Black toner is uniformly placed on one side of PPC paper (1 cm×5 cm), and the sample-coated surface of the rubber piece of (1) and the toner side of the paper are superposingly put together.

(3) The matter put together in (2) is pressed using a heat pressing machine (TP-701S sheet seal tester, manufactured by Tester Sangyo K. K.) under conditions of 200° C., 4 kg/cm$^2$ and 5 seconds.

(4) The test piece thus obtained in (3) is cooled to room temperature (25° C.). Thereafter, the PPC paper is peeled off and the quantity of toner remaining on the rubber piece is visually observed.

The releasability of toner was evaluated as;

A: Almost no toner remains on the rubber piece surface.

C: Toner remains on the rubber piece surface in a rather large quantity.

The results of evaluation were as shown in Table 1.

Example 3

With regard to the organopolysiloxanes produced in Synthesis Examples 1 and 2, the electric-contact failure was evaluated in the manner shown below.

(1) A 90 mm diameter glass Petri dish containing 10 g of a sample and a DC motor (LC20-129, manufactured by Koparu Denshi K. K.) are placed in a 4 liter volume container made of metal and the container is hermetically sealed.

(2) The metal container of (1) is put in a 60° C. thermostatic chamber, and the motor is electrified to set it driving.

(3) The time period from the start to the stop of the motor is recorded.

The electric-contact failure was evaluated as;

A: Motor does not stop for 100 hours or longer.

C: Motor stops within a time shorter than 50 hours.

The results of evaluation were as shown in Table 1.

Comparative Example 1

The wettability, releasability of toner and electric-contact failure were evaluated in the same manner as in Examples 1 to 3 except for using the organopolysiloxane produced in Synthesis Example 3.

The results of evaluation were as shown in Table 1.

Comparative Example 2

The wettability, releasability of toner and electric-contact failure were evaluated in the same manner as in Examples 1 to 3 except for using a commercially available dimethylpolysiloxane (viscosity at 25° C.: 300 cSt; available from Shin-Etsu Chemical Co., Ltd.).

The results of evaluation were as shown in Table 1.

TABLE 1

|  | Wettability to PFA | Releasability of toner | Electric-contact failure |
| --- | --- | --- | --- |
| Example 1 | A | A | A |
| Example 2 | A | A | A |
| Comparative Example 1 | A | A | C |
| Comparative Example 2 | C | C | C |

As described above, the anti-offsetting oil of the present invention has good wettability to PFA and good releasability of toner, and besides has a very low possibility of causing the electric-contact failure which is peculiar to silicone fluids. Thus, the present anti-offsetting oil is seen to be suitable.

What is claimed is:

1. An anti-offsetting oil, comprising an organopolysiloxane having the formula (1):

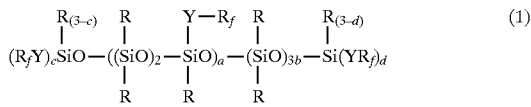

wherein R represents a monovalent hydrocarbon group having 1 to 15 carbon atoms, which are the same or different; Y represents a divalent organic group having 2 to 5 carbon atoms, which are the same or different; a represents an integer of 1 or more, and b represents an integer of 0 or more, provided that a and b satisfy:

$$3a+3b+2=15 \text{ to } 4{,}000$$

and wherein c and d is each an integer of 0 to 3, and an organopolysiloxane having a molecular weight of 3,000 or less is present in an amount of 50 ppm or less; and wherein $R_f$ is a perfluoropolyether group having the formula (1a):

wherein $R^1$ is —CF(CF$_3$)—, —CF$_2$CF$_2$— or —CF(CF$_3$)CF$_2$—; and p is an integer of 1 to 5; or a perfluoroalkyl group having the formula (1b):

wherein L is an integer of 3 to 20.

2. The anti-offsetting oil of claim 1, wherein said organopolysiloxane having a molecular weight of 3,000 or less is present in an amount of 25 ppm or less.

3. The anti-offsetting oil of claim 1, wherein said organopolysiloxane having a molecular weight of 3,000 or less is present in an amount of 10 ppm or less.

4. The anti-offsetting oil of claim, 1 wherein $R_f$ is a group represented by:

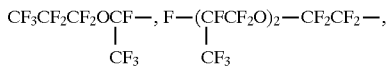

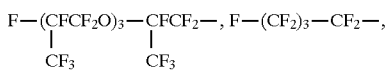

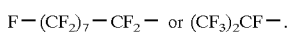

5. The anti-offsetting oil of claim 1, wherein the monovalent hydrocarbon represented by R in the formula (1) is an alkyl group having 1 to 6 carbon atoms, an aryl group having 6 to 10 carbon atoms, or an arylalkyl group having 7 to 15 carbon atoms.

6. The anti-offsetting oil of claim 1, where Y in the formula (1) is an ethylene group or an amide linkage.

7. The anti-offsetting oil of claim 1, wherein R in the formula (1) is an alkyl group selected from the group consisting of methyl, ethyl, propyl, pentyl and hexyl.

8. The anti-offsetting oil of claim 1, wherein R in the formula (1) is an aryl group selected from the group consisting of benzyl and phenethyl.

9. The anti-offsetting oil of claim 6, wherein Y in the formula (1) is an alkylene group and is an ethylene group.

10. The anti-offsetting oil of claim 1, wherein a degree of polymerization indicated by 3a+3b+2 is such that the organopolysiloxane has a viscosity at 25° C. of from 100 to 30,000 cSt.

11. The anti-offsetting oil of claim 10, wherein a degree of polymerization indicated by 3a+3b+2 is such that the organopolysiloxane has a viscosity at 25° C. of from 300 to 3,000 cSt.

12. An electrophotographic copying process comprising bringing a heated roll into contact with a toner image transferred onto copying sheet to heat fix the toner image, wherein said roll has a surface formed of a silicone rubber or a fluorine rubber, and the anti-offsetting fluid according to claim 1 is applied in a thin film on the surface.

13. The process according to claim 12, wherein said organopolysiloxane having a molecular weight of 3,000 or less is present in a content of 25 ppm or less.

14. The process according to claim 12, wherein said organopolysiloxane having a molecular weight of 3,000 or less is present in a content of 10 ppm or less.

15. The process according to claim 12, wherein the $R_f$ in the formula (1) is a group represented by

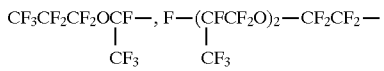

and

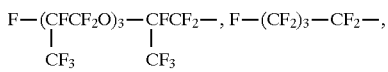

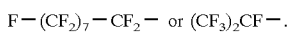

16. The process according to claim 12, wherein the monovalent hydrocarbon represented by R in the formula (1) is an alkyl group having 1 to 6 carbon atoms, an aryl group having 6 to 10 carbon atoms or an aralkyl group having 7 to 15 carbon atoms.

17. The process according to claim 12, wherein the Y in the formula (1) is an ethylene group or an amide linkage.

* * * * *